United States Patent
Shemesh et al.

(10) Patent No.: US 10,397,250 B1
(45) Date of Patent: Aug. 27, 2019

(54) METHODS FOR DETECTING REMOTE ACCESS TROJAN MALWARE AND DEVICES THEREOF

(71) Applicant: F5 Networks, Inc., Seattle, WA (US)

(72) Inventors: Yaniv Shemesh, Seattle, WA (US); Itai Tenenbaum, Seattle, WA (US); Hadasa Dorfman, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 37 days.

(21) Appl. No.: 15/411,686

(22) Filed: Jan. 20, 2017

Related U.S. Application Data (60) Provisional application No. 62/281,408, filed on Jan. 21, 2016.

(51) Int. Cl.
*H04L 29/06* (2006.01)
*H04L 29/08* (2006.01)

(52) U.S. Cl.
CPC ...... *H04L 63/1416* (2013.01); *H04L 63/1425* (2013.01); *H04L 63/20* (2013.01); *H04L 67/02* (2013.01)

(58) Field of Classification Search
CPC . H04L 63/1416; H04L 63/1425; H04L 63/20; H04L 67/02
USPC .......................................................... 726/1
See application file for complete search history.

(56) References Cited

U.S. PATENT DOCUMENTS

| | | |
|---|---|---|
| 4,783,828 A | 11/1988 | Sadjadi et al. |
| 5,537,488 A | 7/1996 | Menon et al. |
| 6,118,893 A | 9/2000 | Li |
| 6,748,056 B1 | 6/2004 | Capriotti et al. |
| 6,769,066 B1 | 7/2004 | Botros et al. |
| 7,228,412 B2 | 6/2007 | Freed |
| 7,406,606 B2 | 7/2008 | Chawla et al. |
| 7,441,429 B1 | 10/2008 | Nucci et al. |
| 7,519,834 B1 | 4/2009 | Dondeti et al. |
| 7,624,447 B1 | 11/2009 | Horowitz et al. |
| 7,743,415 B2 | 6/2010 | Poletto et al. |
| 8,572,733 B1 | 10/2013 | Rockwood |

(Continued)

OTHER PUBLICATIONS

F5 Networks, Inc., "BIG-IP® Application Security Manager™: Getting Started", Manual, Aug. 25, 2014, pp. 1-78, version 11.6, F5 Networks, Inc.

(Continued)

*Primary Examiner* — Michael Pyzocha
*Assistant Examiner* — Zoha Piyadehghibi Tafaghodi
(74) *Attorney, Agent, or Firm* — Pepper Hamilton LLP (57) ABSTRACT

Methods, non-transitory computer readable media, and security management apparatus that retrieves a web page in response to a request for the web page received from a client device. Remote access trojan (RAT) malware detection source code is injected into the web page and the web page is sent to the client device in response to the request. The RAT malware detection client-side source code is configured to, when executed by a web browser of the client device, output an alert when a possible attack is detected based on monitored movement of a mouse pointer, key events, or executing animations. A determination is made when the alert has been received from the client device. A security action is initiated according to an established policy, when the determining indicates that the alert has been received from the client device.

16 Claims, 6 Drawing Sheets

(56) References Cited

U.S. PATENT DOCUMENTS

| | | | |
|---|---|---|---|
| 8,943,588 B1 | 1/2015 | Speegle | |
| 9,077,709 B1 | 7/2015 | Dall | |
| 9,578,055 B1 | 2/2017 | Khanal | |
| 9,628,499 B1 | 4/2017 | Yu et al. | |
| 9,654,485 B1 | 5/2017 | Neumann | |
| 9,900,344 B2 | 2/2018 | Smith et al. | |
| 9,967,250 B2 | 5/2018 | Johansson et al. | |
| 2002/0116615 A1 | 8/2002 | Nguyen et al. | |
| 2003/0042439 A1 | 3/2003 | Rusu et al. | |
| 2003/0073091 A1 | 4/2003 | Krylov et al. | |
| 2003/0145232 A1 | 7/2003 | Poletto et al. | |
| 2003/0199762 A1 | 10/2003 | Fritz et al. | |
| 2004/0037326 A1 | 2/2004 | D'souza et al. | |
| 2004/0103283 A1 | 5/2004 | Hornak | |
| 2004/0170123 A1 | 9/2004 | Carpenter et al. | |
| 2005/0027846 A1 | 2/2005 | Wolfe et al. | |
| 2005/0111367 A1 | 5/2005 | Chao et al. | |
| 2005/0195840 A1 | 9/2005 | Krapp et al. | |
| 2005/0198519 A1 | 9/2005 | Tamura et al. | |
| 2006/0031483 A1 | 2/2006 | Lund et al. | |
| 2006/0031928 A1 | 2/2006 | Conley et al. | |
| 2007/0118894 A1 | 5/2007 | Bhatia | |
| 2007/0280114 A1 | 12/2007 | Chao et al. | |
| 2007/0294187 A1 | 12/2007 | Scherrer | |
| 2008/0028467 A1 | 1/2008 | Kommareddy et al. | |
| 2008/0263215 A1 | 10/2008 | Schnellbaecher | |
| 2008/0320567 A1 | 12/2008 | Shulman et al. | |
| 2009/0199297 A1* | 8/2009 | Jarrett | G06F 21/566 726/24 |
| 2010/0031315 A1 | 2/2010 | Feng et al. | |
| 2010/0070451 A1 | 3/2010 | Hugues | |
| 2010/0284282 A1 | 11/2010 | Golic | |
| 2010/0325418 A1 | 12/2010 | Kanekar | |
| 2011/0012586 A1 | 1/2011 | Montanar et al. | |
| 2011/0072516 A1 | 3/2011 | Cohen et al. | |
| 2011/0154026 A1 | 6/2011 | Edstrom | |
| 2011/0264905 A1 | 10/2011 | Ovsiannikov | |
| 2012/0079592 A1 | 3/2012 | Pandrangi et al. | |
| 2012/0144487 A1 | 6/2012 | Kim et al. | |
| 2012/0167210 A1 | 6/2012 | Oro et al. | |
| 2012/0173710 A1 | 7/2012 | Rodriguez et al. | |
| 2012/0323700 A1 | 12/2012 | Aleksandrovich et al. | |
| 2013/0080407 A1 | 3/2013 | Levow | |
| 2013/0276114 A1* | 10/2013 | Friedrichs | G06F 21/56 726/23 |
| 2014/0095865 A1 | 4/2014 | Yerra | |
| 2014/0289854 A1 | 9/2014 | Mahvi | |
| 2014/0298419 A1 | 10/2014 | Boubez | |
| 2014/0317739 A1 | 10/2014 | Be'ery et al. | |
| 2015/0067328 A1 | 3/2015 | Yin | |
| 2015/0088662 A1 | 3/2015 | Noller et al. | |
| 2015/0163234 A1* | 6/2015 | Tal | H04L 63/145 726/1 |
| 2015/0215334 A1 | 7/2015 | Bingham et al. | |
| 2015/0271179 A1 | 9/2015 | Wang et al. | |
| 2015/0295945 A1* | 10/2015 | Canzanese, Jr. | G06F 9/45545 726/23 |
| 2015/0310196 A1* | 10/2015 | Turgeman | G06F 21/552 726/19 |
| 2016/0021117 A1 | 1/2016 | Harmon et al. | |
| 2016/0127406 A1 | 5/2016 | Smith et al. | |
| 2017/0171231 A1 | 6/2017 | Reybok, Jr. et al. | |
| 2017/0249306 A1 | 8/2017 | Allen et al. | |
| 2017/0318053 A1 | 11/2017 | Singh et al. | |
| 2018/0124300 A1 | 5/2018 | Brook | |

OTHER PUBLICATIONS

F5 Networks, Inc., "BIG-IP Application Security Manager Operations Guide", Manual, Feb. 5, 2016, pp. 1-181, F5 Networks, Inc.

F5 Networks, Inc., "F5 BIG-IP TMOS: Operations Guide", Manual, Mar. 5, 2015, pp. 1-276, F5 Networks, Inc.

F5 Networks, Inc., "BIG-IP® Application Security Manager™: Implementations", Manual, Aug. 25, 2014, pp. 1-420, version 11.6, F5 Networks, Inc.

F5 Networks, Inc., "BIG-IP ASM", Release Notes, Jun. 13, 2016, pp. 1-18, version 11.6.1 F5 Networks, Inc.

BIG-IP® Analytics: Implementations, version 11.3, Nov. 15, 2012, F5 Networks, Inc., pp. 1-40.

F5 Networks, "BIG-IP Local Traffic Manager: Concepts", version 11.4, pp. 1-178, retrieved from https://support.f5.com/kb/en-us/products/big-ip_ltm/manuals/product/ltm-concepts-11-4-0.html on Feb. 12, 2015.

F5 Networks, "BIG-IP Local Traffic Manager: Implementations", version 11.4, pp. 1-234, retrieved from https://support.f5.com/kb/en-us/products/big-ip_ltm/manuals/product/ltm-implementations-11-4-0.html on Feb. 12, 2015.

F5 Networks, "BIG-IP Local Traffic Manager: Monitors Reference", version 11.4, pp. 1-106, retrieved from https://support.f5.com/kb/en-us/products/big-ip_ltm/manuals/product/ltm-monitors-reference-11-4-0.html on Feb. 12, 2015.

F5 Networks, "Operations Guide 1.0 F5 Local Traffic Manager and Global Traffic Manager", pp. 1.144, retrieved from https://support.f5.com/kb/en-us/products/big-ip_ltm/manuals/product/f5-ltm-gtm-operations-guide-1-0.html on Feb. 12, 2015.

F5 Networks, "Release Note: BIG-IP LTM and TMOS", version 11.4.1, pp. 1-58, retrieved from https://support.f5.com/kb/en-us/products/big-ip_ltm/releasenotes/product/relnote-ltm-11-4-1.html on Feb. 12, 2015.

F5 Networks, Inc., "BIG-IP ASM 11.5.0", Release Notes, Apr. 12, 2016, Version 11.5.0.

F5 Networks, Inc., "BIG-IP® Analytics: Implementations", Manual, Jan. 31, 2014, pp. 1-50, Version 11.5.

F5 Networks, Inc., "BIG-IP® Analytics: Implementations", Manual, Aug. 25, 2014, pp. 1-62, v11.6, F5 Networks, Inc.

F5 Networks, Inc., "BIG-IP® Application Security Manager™: Implementations", Manual, Jan. 31, 2014, pp. 1-396, Version 11.5.

F5 Networks, Inc., "BIG-IP® Application Security Manager™: Implementations", F5 Networks, Inc., Dec. 10, 2014, version 11.6, pp. 1-420.

F5 Networks, Inc., "BIG-IP® Local Traffic Management: Basics", Manual, Aug. 25, 2014, pp. 1-74, version 11.6, F5 Networks, Inc.

F5 Networks, Inc., "BIG-IP® Network Firewall: Policies and Implementations", Manual, Aug. 10, 2016, pp. 1-166, v11.6, F5 Networks, Inc.

F5 Networks, Inc., "BIG-IP® Systems: DoS Protection and Protocol Firewall Implementations", Manual, Aug. 25, 2014, pp. 1-108, v11.6, F5 Networks, Inc.

F5 Networks, Inc., "BIG-IP® TMOS®: Concepts", Manual, Nov. 11, 2014, pp. 1-148, Version 11.5.

F5 Networks, Inc., "BIG-IP® TMOS®: Implementations", Manual, Jan. 31, 2014, pp. 1-274, Version 11.5.

F5 Networks, Inc., "F5 BIG-IP TMOS: Operations Guide", Manual, Mar. 5, 2015, pp. 1-276 version 11.6, F5 Networks, Inc.

* cited by examiner

```
var tt = Date.now();

var obj_anm = window.requestAnimationFrame ||
              window.webkitRequestAnimationFrame ||
              window.mozRequestAnimationFrame ||
              window.msRequestAnimationFrame ||
              window.oRequestAnimationFrame ;

var fnc = function(){
    var loop = function()
    {
        var str = Date.now() + "\t";
        if(Date.now()-tt > 500)
        {
            str+="Focus"
        }
        else
        {
            str+="Background"
        };
        console.log(str);    // Debug line for example
        tt = Date.now()
    }
    obj_anm(loop);
} setInterval(fnc, 1000);
```

METHODS FOR DETECTING REMOTE ACCESS TROJAN MALWARE AND DEVICES THEREOF

This application claims the benefit of U.S. Provisional Patent Application Ser. No. 62/281,508, filed on Jan. 21, 2016, which is hereby incorporated by reference in its entirety.

FIELD

This technology generally relates to network security and, more particularly, to methods and devices for detecting remote access trojan (RAT) malware to improve network security.

BACKGROUND

Many networks storing web resources, such as web applications, web pages, or other content, include security management apparatus(es) that, among other functions, protect server devices storing the web resources from malicious attacks. One such type of attack is a remote access trojan (RAT) attack in which a RAT uses a client device infected with malware to hijack a user session via a web browser instance, which is most commonly a hidden web browser tab or window. By hijacking the user session, the RAT can steal user credentials or execute fraudulent transactions, for example.

In some types of RAT attacks, the malware on an infected client device is configured to establish a connection to a malicious device over a communication network, such as by virtual network computing (VNC), for example. The established connection allows a user of the malicious device to control the infected client device, including by generating hidden web browser instances and controlling a mouse or other input device.

In one particular example, the malware is configured to automatically establish a connection with a malicious device when the malware determines that a user has established a session with a bank web site. A user of the malicious device can then use the infected client device to instantiate a hidden web browser instance, hijack the session established by the user with the bank web site, and conduct fraudulent transactions using the hijacked session. Unfortunately, there is currently no effective way to detect RAT malware on client devices in order to mitigate RAT attacks.

SUMMARY

A method for detecting remote access trojan (RAT) malware, implemented by a network traffic management system comprising one or more security management apparatuses, client devices, or server devices, includes retrieving a web page in response to a request for the web page received from one of the client devices. RAT malware detection source code is injected into the web page and the web page is sent to the one of the client devices in response to the request. The RAT malware detection client-side source code is configured to output an alert when a possible attack is detected based on monitored movement of a mouse pointer, key events, or executing animations. A determination is made when the alert has been received from the one of the client devices. A security action is initiated according to an established policy, when the determining indicates that the alert has been received from the one of the client devices.

A security management apparatus, comprising one or more comprising memory comprising programmed instructions stored thereon and one or more processors configured to be capable of executing the stored programmed instructions to retrieve a web page in response to a request for the web page received from a client device. RAT malware detection source code is injected into the web page and the web page is sent to the client device in response to the request. The RAT malware detection client-side source code is configured to output an alert when a possible attack is detected based on monitored movement of a mouse pointer, key events, or executing animations. A determination is made when the alert has been received from the client device. A security action is initiated according to an established policy, when the determining indicates that the alert has been received from the client device.

A non-transitory computer readable medium having stored thereon instructions for detecting RAT malware comprising executable code which when executed by one or more processors, causes the one or more processors to retrieve a web page in response to a request for the web page received from a client device. RAT malware detection source code is injected into the web page and the web page is sent to the client device in response to the request. The RAT malware detection client-side source code is configured to output an alert when a possible attack is detected based on monitored movement of a mouse pointer, key events, or executing animations. A determination is made when the alert has been received from the client device. A security action is initiated according to an established policy, when the determining indicates that the alert has been received from the client device.

A network traffic management system, comprising one or more security management apparatuses, client devices, or server devices, the network traffic management system comprising memory comprising programmed instructions stored thereon and one or more processors configured to be capable of executing the stored programmed instructions to retrieve a web page in response to a request for the web page received from a client device. RAT malware detection source code is injected into the web page and the web page is sent to the client device in response to the request. The RAT malware detection client-side source code is configured to output an alert when a possible attack is detected based on monitored movement of a mouse pointer, key events, or executing animations. A determination is made when the alert has been received from the client device. A security action is initiated according to an established policy, when the determining indicates that the alert has been received from the client device.

This technology has a number of associated advantages including providing methods, non-transitory computer readable media, security management apparatuses, and network traffic management systems that more effectively detect RAT malware in order to improve network security. With this technology, RAT malware that may have infected a client device can be detected based on injected client-side source code that is capable of monitoring activity occurring on the client device to determine whether the device is being exploited by a malicious third party via RAT malware.

DETAILED DESCRIPTION

Figure 1:
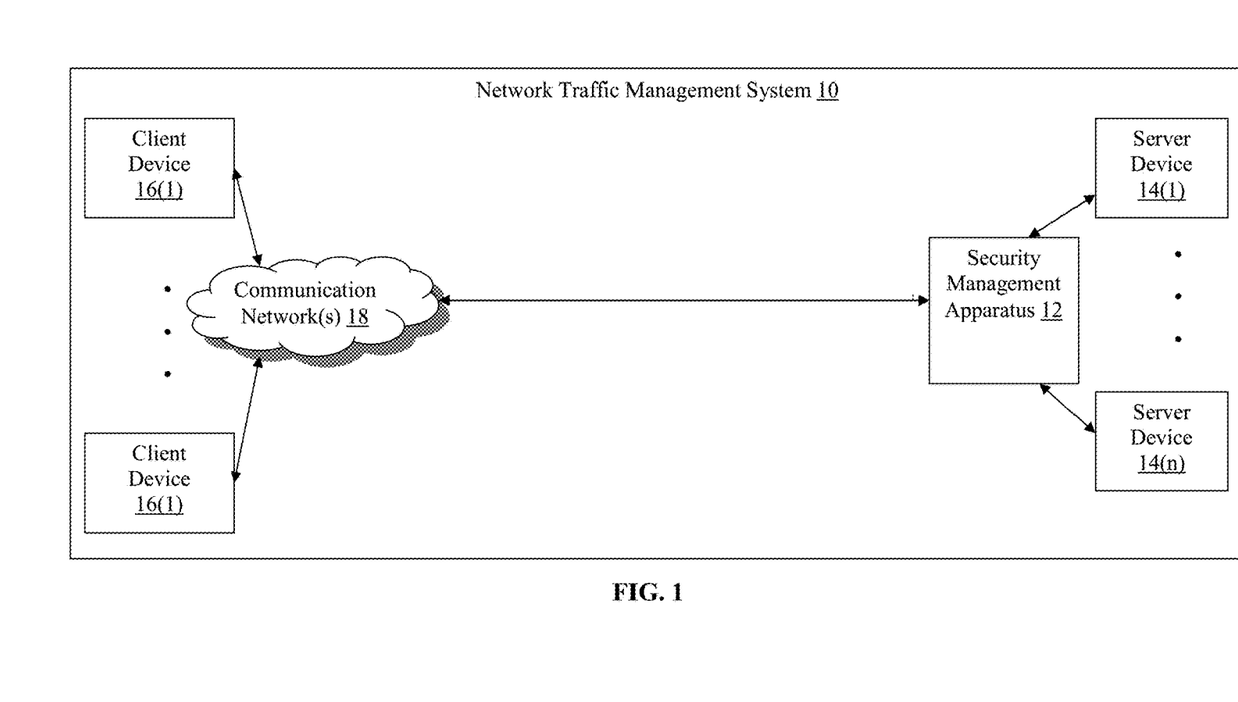
FIG. 1 is a block diagram of an exemplary network traffic management system with a security management apparatus, server devices, and client devices.

Referring to FIG. 1, an exemplary network traffic management system 10, which incorporates an exemplary security management apparatus 12 is illustrated. The security management apparatus 12 in this example is coupled to a plurality of server devices 14(1)-14(n) and a plurality of client devices 16(1)-16(n) via communication network(s) 18, although the security management apparatus 12, server devices 14(1)-14(n), and client devices 16(1)-16(n) may be coupled together via other topologies. Additionally, the network traffic management system 10 may include other network devices such as one or more routers and/or switches, for example, which are well known in the art and thus will not be described herein. This technology provides a number of advantages including methods, non-transitory computer readable media, security management apparatuses, and network traffic management systems that improve network security by more effectively detecting and preventing network traffic originating from, malicious smart bots.

Figure 2:
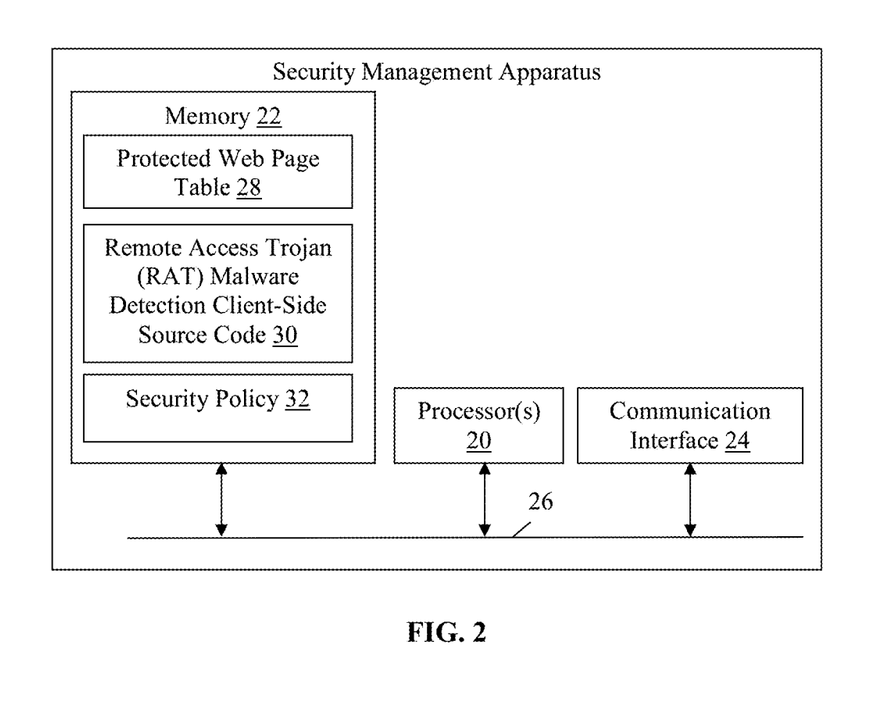
FIG. 2 is a block diagram of the exemplary security management apparatus shown in FIG. 1.

Referring to FIGS. 1-2, the security management apparatus 12 of the network traffic management system 10 may perform any number of functions including managing network traffic, load balancing network traffic across the server devices 14(1)-14(n), or accelerating network traffic associated with web applications hosted by the server devices 14(1)-14(n), in addition to providing security services and protecting the server devices 14(1)-14(n) from network attacks. The security management apparatus 12 in this example includes one or more processors 20, a memory 22, and a communication interface 24, which are coupled together by a bus 26 or other communication link, although the security management apparatus 12 can include other types and numbers of elements in other configurations.

The processor(s) 20 of the security management apparatus 12 may execute programmed instructions for the any number of the functions identified above. The processor(s) 20 may include one or more CPUs or general purpose processors with one or more processing cores, for example, although other types of processor(s) can also be used.

The memory 22 of the security management apparatus 12 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 20, can be used for the memory 22.

Accordingly, the memory of the security management apparatus can store one or more applications that can include computer executable instructions that, when executed by the security management apparatus, cause the security management apparatus to perform actions, such as to transmit, receive, or otherwise process network traffic, for example, and to perform other actions described and illustrated below with reference to FIGS. 3-5. The application(s) can be implemented as modules or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the security management apparatus 12 itself, may be located in virtual server(s) running in a cloud-based computing environment rather than being tied to one or more specific physical network computing devices. Also, the application(s) may be running in one or more virtual machines (VMs) executing on the security management apparatus 12. Additionally, in one or more embodiments of this technology, virtual machine(s) running on the security management apparatus 12 may be managed or supervised by a hypervisor.

In this particular example, the memory of the security management apparatus includes a protected web page table 28, RAT malware detection client-side source code 30, and a security policy 32, although the memory can include other policies, modules, databases, or applications, for example. The protected web page table 28 includes an indication (e.g., URL) of each web page for which protection against RAT malware is to be provided by the security management apparatus 12. Exemplary web pages include banking or retail web pages, for example, although any other type of web page can be protected using this technology. The protected web page table can be populated by an administrator of the security management apparatus 12 via a provided administrator graphical user interface (GUI), for example.

The RAT malware detection client-side source code 30 can be injected into protected web pages requested by the client devices 16(1)-16(n) and executed by web browsers of the client devices 16(1)-16(n). When executed by the web browsers of the client devices 16(1)-16(n), the RAT malware detection client-side source code 30 monitors activity such as mouse movement, key press events, or execution of animations. Based on the monitored activity, the RAT malware detection client-side source code 30 is configured to determine whether a web browser instance (e.g., a hidden tab or window) may be used by a RAT to hijack an open user session and steal information or conduct fraudulent transactions, for example, as described and illustrated in more detail later. If the RAT malware determines that one of the client devices may be infected with RAT malware that is currently being exploited, the RAT malware detection client-side source code 30 is further configured to output an alert to the security management apparatus 12. The RAT malware detection client-side source code 30 may be implemented in JavaScript, although another type of source code can also be used.

The security policy 32 defines action(s) that should be taken in response to receiving an alert from one of the client devices 16(1)-16(n) executing the RAT malware detection client-side source code 30 indicating a possible attack. Optionally, the security policy 32 can require that the security management apparatus 12 correlate other information with the alert to determine whether a user session should be terminated, a user should be automatically notified of the possible attack, or network traffic should be further analyzed or blocked, for example. The security policy 32 can be established by an administrator of the security management apparatus 12 via a provided administrator GUI, for example.

The communication interface 24 of the security management apparatus 12 in this example operatively couples and communicates between the security management apparatus 12, the server devices 14(1)-14(n), and/or the client devices 16(1)-16(n), which are all coupled together by the communication network(s) 18, although other types and numbers of communication networks or systems with other types and/or numbers of connections and configurations to other devices and/or elements can also be used.

By way of example only, the communication network(s) 18 can include local area network(s) (LAN(s)) and/or wide area network(s) (WAN(s)), and can use TCP/IP over Ethernet and industry-standard protocols, although other types and numbers of protocols and/or communication networks can be used. The communication network(s) 18 in this example can employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The communication network(s) can also include direct connection(s) (e.g., for when a device illustrated in FIG. 1, such as the security management apparatus 18 or server devices 14(1)-14(n) operate as virtual instances on the same physical machine).

While the security management apparatus 12 is illustrated in this example as including a single device, the security management apparatus 12 in other examples can include a plurality of devices or blades each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the security management apparatus 12.

Additionally, one or more of the devices that together comprise the security management apparatus 12 in other examples can be standalone devices or integrated with one or more other devices or apparatuses, such as the server devices 14(1)-14(n), for example. Moreover, one or more of the devices of the security management apparatus 12 in these examples can be in a same or a different communication network including one or more public, private, or cloud networks, for example.

Each of the server devices 14(1)-14(n) of the network traffic management system 10 in this example includes one or more processors, a memory, and a communication interface, which are coupled together by a bus or other communication link, although other numbers and types of network devices could be used. The server devices 14(1)-14(n) process requests received from the client devices 16(1)-16(n) via the communication network(s) 18 according to the HTTP-based application RFC protocol, for example. Various applications may be operating on the server devices 14(1)-14(n) and transmitting data (e.g., files or Web pages) to the client devices 16(1)-16(n) via the security management apparatus 12 in response to requests from the client devices 16(1)-16(n). The server devices 14(1)-14(n) may be hardware or software or may represent a system with multiple servers in a pool, which may include internal or external networks.

Although the server devices 14(1)-14(n) are illustrated as single devices, one or more actions of each of the server devices 14(1)-14(n) may be distributed across one or more distinct network computing devices that together comprise one or more of the server devices 14(1)-14(n). Moreover, the server devices 14(1)-14(n) are not limited to a particular configuration. Thus, the server devices 14(1)-14(n) may contain a plurality of network computing devices that operate using a master/slave approach, whereby one of the network computing devices of the server devices 14(1)-14(n) operate to manage and/or otherwise coordinate operations of the other network computing devices. The server devices 14(1)-14(n) may operate as a plurality of network computing devices within a cluster architecture, a peer-to peer architecture, virtual machines, or within a cloud architecture, for example.

Thus, the technology disclosed herein is not to be construed as being limited to a single environment and other configurations and architectures are also envisaged. For example, one or more of the server devices 14(1)-14(n) can operate within the security management apparatus 12 itself rather than as a stand-alone server device communicating with the security management apparatus 12 via the communication network(s) 18. In this example, the one or more server devices 14(1)-14(n) operate within the memory 22 of the security management apparatus 12.

The client devices 16(1)-16(n) of the network traffic management system 10 in this example may include any type of computing device that can generate network traffic that appears to originate with a web browser, such as mobile computing devices, desktop computing devices, laptop computing devices, tablet computing devices, virtual machines (including cloud-based computers), or the like. Each of the client devices 16(1)-16(n) in this example includes a processor, a memory, and a communication interface, which are coupled together by a bus or other communication link, although other numbers and types of network devices could be used.

The client devices 16(1)-16(n) may run interface applications, such as standard web browsers or standalone applications, which may provide an interface to make requests for, and receive resources stored on, one or more of the server devices 14(1)-14(n) via the communication network(s) 18. The client devices 16(1)-16(n) may further include a display device, such as a display screen or touchscreen, and/or an input device, such as a keyboard for example.

Although the exemplary network traffic management system 10 with the security management apparatus 12, server devices 14(1)-14(n), client devices 16(1)-16(n), and communication network(s) 18 are described and illustrated herein, other types and numbers of systems, devices, components, and elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network traffic management system 10, such as the security management apparatus 12, client devices 16(1)-16(n), or server devices 14(1)-14(n), for example, may be configured to operate as virtual instances on the same physical machine. In other words, one or more of the security management apparatus 12, client devices 16(1)-16(n), or server devices 14(1)-14(n) may operate on the same physical device rather than as separate devices communicating through communication network(s). Additionally, there may be more or fewer security management apparatuses, client devices, or server devices than illustrated in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

An exemplary method of detecting RAT malware will now be described with reference to FIGS. 1-6. Referring more specifically to FIG. 3, a flowchart of an example of a method for improving by the security management apparatus 12 protection of web sites from RAT malware attacks is illustrated. In step 300 in this example, the security management apparatus 12 of the network traffic management system 10 receives a request for a web page from one of the client devices 16(1)-16(n) and retrieves the web page from one of the server devices 14(1)-14(n).

In step 302, the security management apparatus 12 determines whether the web page is to be protected against RAT attacks. In one example, an administrator of the security management apparatus 12 can populate the protected web page table 28 with an indication of web pages that are to be protected. In this example, the security management apparatus 12 can compare an indication (e.g., a URL) of the web page retrieved from the one of the server devices 14(1)-14(n) to the protected web page table 28 to determine whether there is a match.

In some examples, protected web pages can include those that require a login, submission of credentials, establishment of user sessions, or communication of personal information, such as social security numbers or financial information (e.g., credit card numbers or bank account information), although other types of web pages can also be protected. In other examples, the security management apparatus 12 can be configured to automatically determine whether a web page should be protected based on an analysis of the web page. In yet other examples, all web pages obtained by the security management apparatus 12 can be protected. Other policies or methods of determining when a web page is to be protected can also be used.

If the security management apparatus 12 determines that the web page is not protected, then the No branch is taken to step 304. In step 304, the security management apparatus 12 sends the web page to the one of the client devices 16(1)-16(n) in response to the request received in step 300. However, if the security management apparatus 12 determines in step 302 that the web page is to be protected, then the Yes branch is taken to step 306.

In step 306, the security management apparatus 12 injects the RAT malware detection client-side source code 30 into the web page. The RAT malware detection client-side source code 30 is configured to, when executed by a web browser of the one of the client devices 16(1)-16(n), determine whether an attack by a RAT via RAT malware executing on the one of the client devices 16(1)-16(n), has possibly occurred. Accordingly, the RAT malware detection client-side source code 30 monitors one or more activities occurring with respect to the one of the client devices 16(1)-16(n) and includes one or more methods of identifying a possible RAT attack. The operation of the RAT malware detection client-side source code 30 is described and illustrated in more detail later with reference to FIG. 4.

In step 308, the security management apparatus 12 sends the web page with the injected RAT malware detection client-side source code 30 to the one of the client devices 16(1)-16(n) in response to the request received in step 300. Upon receipt, a web browser executing on the one of the client devices 16(1)-16(n) executes the web page and the RAT malware detection client-side source code 30 injected therein. The RAT malware detection client-side source code 30 in this example is further configured to, when executed by the web browser of the one of the client devices 16(1)-16(n), output an alert when a possible attack by a RAT has been detected, also as described and illustrated in more detail later with reference to FIG. 4.

Accordingly, in step 310, the security management apparatus 12 determines whether an alert has been received from the one of the client devices 16(1)-16(n). The alert can be any type of network communication that can be interpreted by the security management apparatus 12 as an indication that a RAT attack is possibly occurring on the one of the client devices 16(1)-16(n). If the security management apparatus 12 determines that an alert has been received from the one of the client devices 16(1)-16(n), then the Yes branch is taken to step 312.

In step 312, the security management apparatus 12 initiates a security action according to the established security policy 32 in this example. The security action can include terminating an associated user session, sending a notification to the one of the client devices 16(1)-16(n) or a source of the web page (e.g., a bank), or initiating additional types or layers of security for network traffic sent from the one of the client devices 16(1)-16(n), although other types and/or numbers of security actions can also be initiated by the security management apparatus 12 based on other types of policies.

Referring back to step 312, if the security management apparatus 12 determines that an alert has not been received from the one of the client devices 16(1)-16(n), then the No branch is taken back to step 310 and the security management apparatus 12 effectively waits for an alert to be received from the one of the client devices 16(1)-16(n) or, optionally, for a session associated with the one of the client devices 16(1)-16(n) to be terminated.

Figure 4:
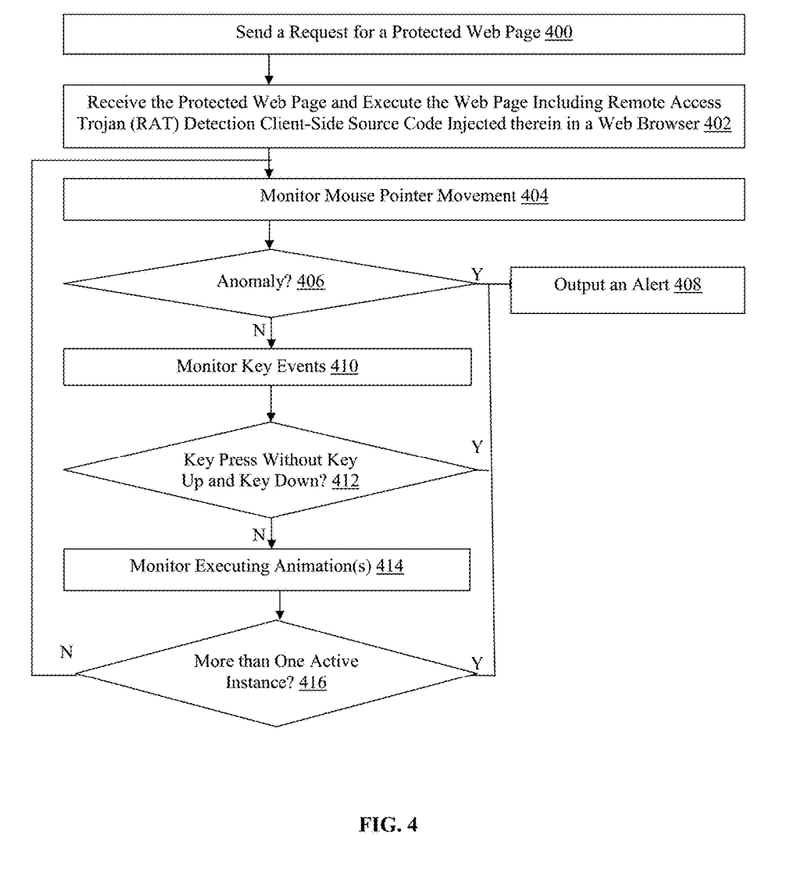
FIG. 4 is a flowchart of an exemplary method for detecting by one of the client devices RAT malware and alerting the exemplary security management apparatus of a possible attack.

Referring more specifically to FIG. 4, a flowchart of an example of a method for detecting by one of the client devices 16(1)-16(n) RAT malware and alerting the security management apparatus 12 of a possible attack is illustrated. In step 400, the one of the client devices 16(1)-16(n) of the network traffic management system 10 sends a request for a protected web page to one of the server devices 14(1)-14(n). In step 402, the one of the client devices 16(1)-16(n) receives the protected web page and executes the web page, including RAT malware detection client-side source code 30 injected therein, in a web browser.

Figure 3:
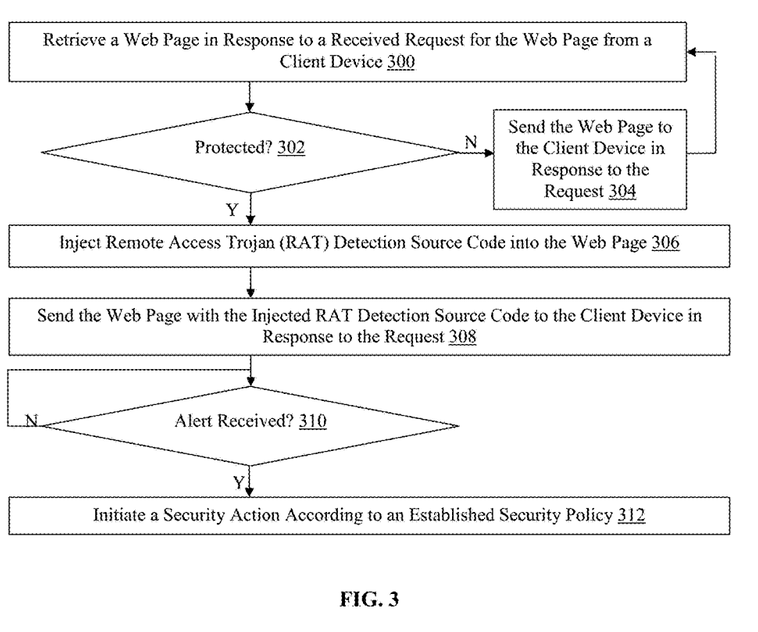
FIG. 3 is a flowchart of an exemplary method for improving by the exemplary security management apparatus protection of web sites from RAT malware attacks.

Accordingly, the security management apparatus 12 could have intercepted the request sent from the one of the client devices 16(1)-16(n) in step 400, retrieved the web page from the one of the server devices 14(1)-14(n), determined that the web page was protected, and injected the RAT malware detection client-side source code 30 into the web page, as described and illustrated in more detail earlier with reference to steps 300, 302, 306, and 308 of FIG. 3. However, other methods of receiving a web page with injected RAT malware detection client-side source code 30 could be used in other examples.

In step 404, the one of the client devices 16(1)-16(n) executing the RAT malware detection client-side source code 30 in a web browser monitors mouse movement based on position (e.g., (X, Y) coordinates) of a pointer, cursor, or other input device indication (commonly referred to herein as a mouse pointer). The mouse pointer movement can be monitored using an application programming interface (API) in JavaScript that tracks the position of the mouse pointer, for example, although other methods of monitoring mouse pointer movement can also be used.

In step 406, the one of the client devices 16(1)-16(n) executing the RAT malware detection client-side source code 30 in a web browser determines whether an anomaly is observed in the movement of the mouse pointer based on a deviation in an expected path of the mouse pointer. A deviation in an expected path of the mouse pointer may indicate use of the mouse pointer on more than one instance (e.g., hidden tab or window) of the web browser.

A RAT using a hijacked user session may control the mouse pointer of the one of the client devices 16(1)-16(n) in order to initiate a fraudulent transaction or perform another malicious transaction, while the user of the one of the client devices 16(1)-16(n) is also utilizing the input device and same user session. More than one source of mouse pointer control will result in a mouse pointer path that is disjointed or deviates from an expected path, indicating current use of a RAT by a malicious third party.

Accordingly, if the one of the client devices 16(1)-16(n) executing the RAT malware detection client-side source code 30 in the web browser determines in step 406 that an anomaly is observed in the movement of the mouse pointer, then the Yes branch is taken to step 408. In step 408, the one of the client devices 16(1)-16(n) executing the RAT malware detection client-side source code 30 in the web browser outputs an alert.

In one example, the alert can be a network message sent to the security management apparatus 12 and including an indication of the monitored activity that resulted in the alert, for example. In another example, the alert can be a graphical display output on the one of the client devices 16(1)-16(n) indicating that a RAT attack may be occurring. Other types or combinations of alerts can also be used in other examples, and other actions can also be taken in response to determining that a possible RAT attack is occurring.

Referring back to step 406, if the one of the client devices 16(1)-16(n) executing the RAT malware detection client-side source code 30 determines that an anomaly is not observed in the movement of the mouse pointer, then the No branch is taken to step 410. In the sixth step 410, the one of the client devices 16(1)-16(n) executing the RAT malware detection client-side source code 30 monitors key events. Key events can include key up events, key press events, and key down events. Key events are generated whenever a user presses a key on a keyboard or other input device, such as to enter a password or other information into a text field, for example.

In step 412, the one of the client devices 16(1)-16(n) executing the RAT malware detection client-side source code 30 determines when one or more monitored key press event are not preceded by a key down event and followed by a key up event. Malicious third parties using a RAT to control an infected one of the client devices 16(1)-16(n) (e.g., via virtual networking computing (VNC)) will insert values into text fields, for example, by initiating key press events.

However, the key press events initiated by such malicious third parties do not result from a press of a key on a keyboard attached to one of the client devices 16(1)-16(n), and therefore will not be preceded by key down events or followed by key up events. In contrast, a user of one of the client devices 16(1)-16(n) that uses an attached keyboard, or other input device, will generate a key down event, followed by a key press event, followed by a key up event in order to enter one value (or multiple key press events between key down and key up events in order to enter multiple consecutive of the same value).

A monitored key press event that is not preceded by a key up event and followed by a key down event is indicative of insertion of a value by a malicious third party using RAT malware. Accordingly, if the one of the client devices 16(1)-16(n) executing the RAT malware detection client-side source code 30 determines that one or more monitored key press events are not preceded by a key down event and followed by a key up event, then the Yes branch is taken to step 408, and the one of the client devices 16(1)-16(n) outputs an alert as described and illustrated in more detail earlier.

However, if the one of the client devices 16(1)-16(n) executing the RAT malware detection client-side source code 30 does not determine in step 412 that one or more monitored key press events are not preceded by a key down event and followed by a key up event, then the No branch is taken to step 414. In step 414, the one of the client devices 16(1)-16(n) executing the RAT malware detection client-side source code 30 monitors an animation defined in the RAT malware detection client-side source code 30 to determine whether the animation is currently executing. Additionally, the one of the client devices 16(1)-16(n) executing the RAT malware detection client-side source code 30 is configured in step 414 to cause the web browser to determine whether multiple such animations are executing concurrently, indicating that more than one instance of the web browser is active.

Figure 5:
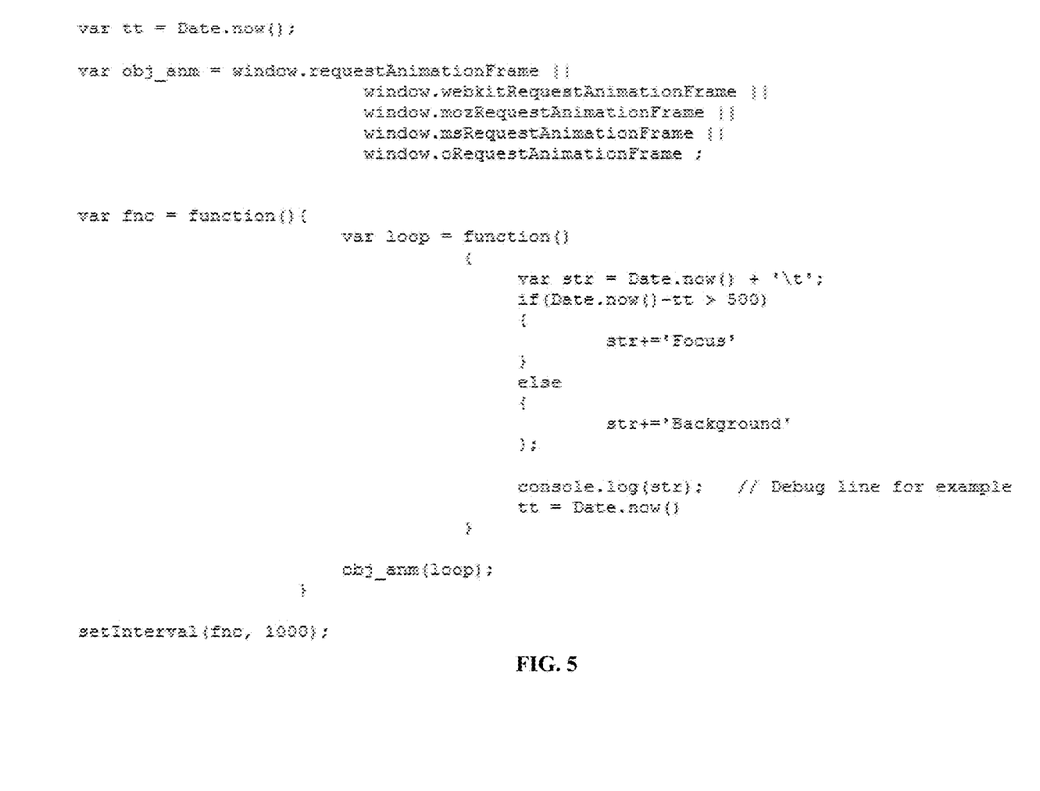
FIG. 5 is exemplary pseudocode defining an animation that facilitates informing a web browser regarding whether an associated web browser instance is in focus or in the background.

Referring more specifically to FIG. 5, exemplary pseudocode defining an animation that facilitates informing a web browser regarding whether an associated web browser instance is in focus or in the background is illustrated. In this example, the RAT malware detection client-side source code 30 defines an animation. The source code (e.g., JavaScript) defining the animation will execute even when the associated web browser instance (e.g., tab or window) is in the background. However, the frames-per-second of the animation will be zero when the associated RAT malware detection client-side source code 30 defining the animation is executing in a background web browser instance.

Accordingly, the pseudocode illustrated in FIG. 5 is configured to output a string indicating "focus" or "background" that indicates whether the corresponding animation is currently executing, and is therefore defined in RAT malware detection client-side source code 30 that is executing in an active web browser instance. The output string can have a "focus" value whenever the determined frames-per-second value is greater than zero.

If the pseudocode illustrated in FIG. 5 outputs multiple "focus" strings, the associated RAT malware detection client-side source code 30 can be configured to cause the web browser to determine that multiple animations are currently executing and multiple web browser instances are currently active. Since only one web browser instance can be active at any time, two or more active web browser instances is indicative of use of a hidden web browser instance that is in active use by a malicious third party using a RAT.

Referring back to FIG. 4, the one of the client devices 16(1)-16(n) executing the RAT malware detection client-side source code 30 determines in step 416 whether there is currently more than one active web browser instance based on the monitored animation(s). The one of the client devices 16(1)-16(n) will determine that there is more than one active instance if RAT malware detection client-side source code 30 defining an animation is executing in multiple web browser instances and informing the web browser that the associated animation is currently executing.

Accordingly, if the one of the client devices 16(1)-16(n) executing the RAT malware detection client-side source code 30 determines that there is currently more than one active web browser instance based on the monitored animation(s), then the Yes branch is taken to step 408, and the one of the client devices 16(1)-16(n) outputs an alert, as described and illustrated in more detail earlier. However, if the one of the client devices 16(1)-16(n) executing the RAT malware detection client-side source code 30 determines that there is not currently more than one active web browser instance based on the monitored animation(s), then the No branch is taken back to step 404, and the one of the client devices 16(1)-16(n) continues executing the RAT malware detection client-side source code 30.

In examples described and illustrated herein, the RAT malware detection client-side source code 30 is configured to monitor movement of a mouse pointer, key press events, or executing animations in order to determine whether the one of the client devices 16(1)-16(n) may be experiencing a RAT attack. However, other types of activities occurring at the one of the client devices could also be monitored in other examples. Further, the order of the monitored activities in steps 406, 412, and 416 can vary from the examples described and illustrated herein.

While the RAT malware detection client-side source code 30 in this example is configured to output an alert based on satisfaction of a condition associated with each monitored activity, the RAT malware detection client-side source code 30 can also be configured to output an alert based on satisfaction of a condition associated with more than one monitored activity in other examples. Accordingly, the RAT malware detection client-side source code 30 can be configured to output the alert only when an anomaly is observed based on mouse pointer movement and a key press event, without a key up event and a key down event, is also observed, and any other combination with respect to the monitored activities in steps 406, 412, and 416 can also be used.

Figure 6:
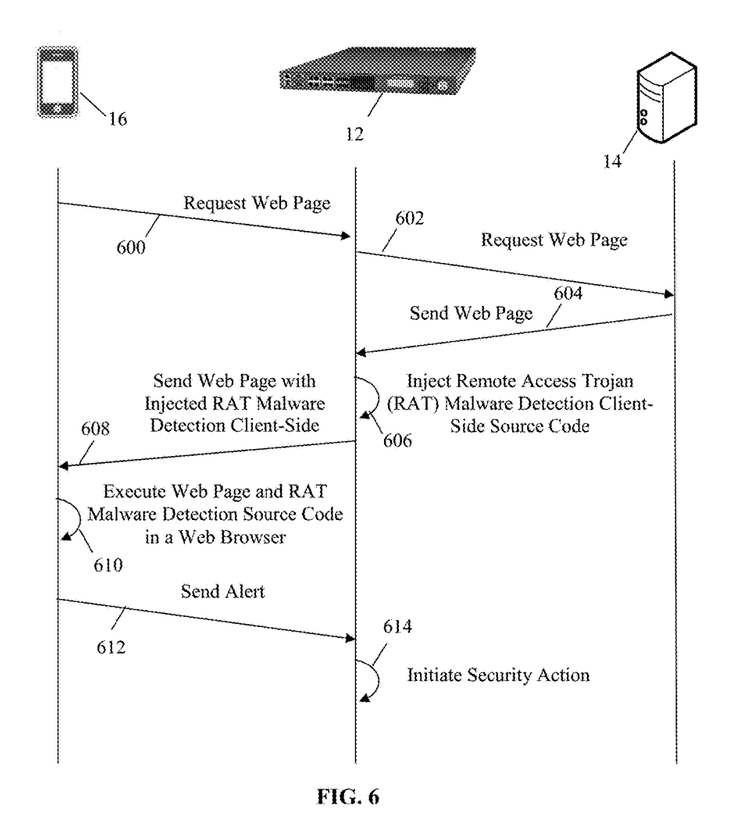
FIG. 6 is a timing diagram illustrating an exemplary method for detecting RAT malware.

Referring more specifically to FIG. 6, a timing diagram of a method of detecting RAT malware is illustrated. In step 600 in this example, the client device 16 sends a request for a web page to the security management apparatus 12. In step 602, the security management apparatus 12 sends a request for the web page to the server device 14. In step 604, the server device 14 sends the web page to the security management apparatus 12.

In step 606, the security management apparatus 12 optionally determines whether the web page is protected and injects the RAT malware detection client-side source code 30 into the web page when the web page is determined to be protected. In step 608, the security management apparatus 12 sends the web page with the injected RAT malware detection client-side source code 30 to the client device 16.

In step 610, the client device 16 executes the web page and the RAT malware detection client-side source code 30 in a web browser. The RAT malware detection client-side source code 30 is configured to monitor activity occurring at the client device 16, such as mouse pointer movement, key events, and executing animations, to determine whether a possible RAT attack is detected. In this particular example, a possible RAT attack is detected by the client device 16 and, accordingly, the client device 16 sends an alert to the security management apparatus 12 in step 612.

In step 614, the security management apparatus 12 initiates a security action optionally according to a stored, established security policy. The security action can include terminating user sessions associated with the client device 16, blocking network traffic originating from the client device 16, sending a message to the client device 16, or any other type or number of security action(s).

Accordingly, with this technology RAT malware can be more effectively detected based on monitored activity occurring on a client device. This technology improves network security by identifying when RAT malware is being exploited by a malicious third party to control the client device to obtain sensitive information or perform fraudulent transactions, for example.

Having thus described the basic concept of this technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of this technology. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for detecting remote access trojan (RAT) malware implemented by a network traffic management system comprising one or more security management apparatuses, server devices, or client devices, the method comprising:

retrieving a web page from a server in response to a request for the web page received via one or more communication networks from a client;

injecting RAT malware detection client-side source code into the web page and sending the web page via the communication networks to the client, wherein the RAT malware detection client-side source code is configured to:

monitor one or more key press events, to determine when one or more of the key press events are not preceded by a key down event or followed by a key up event, or monitor executing animations, to determine when more than one instance of a web browser of the client is active, and output an alert when a possible network attack is detected based on the monitoring of the key press events or the monitoring of the executing animations;

determining when another alert has been received via the communication networks from the client; and initiating a security action with respect to network traffic associated with the client according to an established policy, when the determination indicates that the another alert has been received via the communication networks from the client.

2. The method of claim 1, wherein the RAT malware detection client-side source code is further configured to:

determine when an anomaly is observed in movement of the mouse pointer based on a deviation in a path of the mouse pointer indicative of use of the mouse pointer on more than one instance of the web browser of the client; and output the alert when the determining indicates that an anomaly is observed in the movement of the mouse pointer.

3. The method of claim 1, wherein the RAT malware detection client-side source code is further configured to:

determine when one of the animations defined in the RAT malware detection client-side source code is executing;

output an indication to the web browser of the client that an instance of the web browser is active when the determining indicates that the one of the animations defined in the RAT malware detection client-side source code is executing; and determine when more than one instance of the web browser of the client is active based on the output indication and output the alert when the determination indicates that more than one instance of the web browser is active.

4. The method of claim 1, further comprising:

determining when the web page is protected; and sending the web page to the client without injecting the RAT malware detection client-side source code, when the determination indicates that the web page is not protected.

5. A security management apparatus, comprising memory comprising programmed instructions stored thereon and one or more processors configured to be capable of executing the stored programmed instructions to:

retrieve a web page from a server in response to a request for the web page received via one or more communication networks from a client;

inject RAT malware detection client-side source code into the web page and send the web page via the communication networks to the client, wherein the RAT malware detection client-side source code is configured to:

monitor one or more key press events, to determine when one or more of the key press events are not preceded by a key down event or followed by a key up event, or monitor executing animations, to determine when more than one instance of a web browser of the client is active, and output an alert when a possible network attack is detected based on the monitoring of the key press events or the monitoring of the executing animations;

determine when another alert has been received via the communication networks from the client; and initiate a security action with respect to network traffic associated with the client according to an established policy, when the determination indicates that the another alert has been received via the communication networks from the client.

6. The security management apparatus of claim 5, wherein the RAT malware detection client-side source code is further configured to:

determine when an anomaly is observed in movement of the mouse pointer based on a deviation in a path of the mouse pointer indicative of use of the mouse pointer on more than one instance of the web browser of the client; and output the alert when the determining indicates that an anomaly is observed in the movement of the mouse pointer.

7. The security management apparatus of claim 5, wherein the RAT malware detection client-side source code is further configured to:

determine when one of the animations defined in the RAT malware detection client-side source code is executing;

output an indication to the web browser of the client that an instance of the web browser is active when the determining indicates that the one of the animations defined in the RAT malware detection client-side source code is executing; and determine when more than one instance of the web browser of the client is active based on the output indication and output the alert when the determination indicates that more than one instance of the web browser is active.

8. The security management apparatus of claim 5, wherein the processors are further configured to be capable of executing the stored programmed instructions to:

determine when the web page is protected; and send the web page to the client without injecting the RAT malware detection client-side source code, when the determination indicates that the web page is not protected.

9. A non-transitory computer readable medium having stored thereon instructions for detecting remote access trojan (RAT) malware comprising executable code which when executed by one or more processors, causes the processors to:

retrieve a web page from a server in response to a request for the web page received via one or more communication networks from a client;

inject RAT malware detection client-side source code into the web page and send the web page via the communication networks to the client, wherein the RAT malware detection client-side source code is configured to:

monitor one or more key press events, to determine when one or more of the key press events are not preceded by a key down event or followed by a key up event, or monitor executing animations, to determine when more than one instance of a web browser of the client is active, and output an alert when a possible network attack is detected based on the monitoring of the key press events or the monitoring of the executing animations;

determine when another alert has been received via the communication networks from the client; and initiate a security action with respect to network traffic associated with the client according to an established policy, when the determination indicates that the another alert has been received via the communication networks from the client.

10. The non-transitory computer readable medium of claim 9, wherein the RAT malware detection client-side source code is further configured to:
   determine when an anomaly is observed in movement of the mouse pointer based on a deviation in a path of the mouse pointer indicative of use of the mouse pointer on more than one instance of the web browser of the client; and
   output the alert when the determining indicates that an anomaly is observed in the movement of the mouse pointer.

11. The non-transitory computer readable medium of claim 9, wherein the RAT malware detection client-side source code is further configured to:
   determine when one of the animations defined in the RAT malware detection client-side source code is executing;
   output an indication to the web browser of the client that an instance of the web browser is active when the determining indicates that the one of the animations defined in the RAT malware detection client-side source code is executing; and
   determine when more than one instance of the web browser of the client is active based on the output indication and output the alert when the determination indicates that more than one instance of the web browser is active.

12. The non-transitory computer readable medium of claim 9, wherein the executable code, when executed by the processors, further causes the processors to:
   determine when the web page is protected; and
   send the web page to the client without injecting the RAT malware detection client-side source code, when the determination indicates that the web page is not protected.

13. A network traffic management system, comprising one or more security management apparatuses, client devices, or server devices, the network traffic management system comprising memory comprising programmed instructions stored thereon and one or more processors configured to be capable of executing the stored programmed instructions to:
   retrieve a web page from a server in response to a request for the web page received via one or more communication networks from a client;
   inject RAT malware detection client-side source code into the web page and send the web page via the communication networks to the client, wherein the RAT malware detection client-side source code is configured to:
      monitor one or more key press events, to determine when one or more of the key press events are not preceded by a key down event or followed by a key up event, or monitor executing animations, to determine when more than one instance of a web browser of the client is active, and
      output an alert when a possible network attack is detected based on the monitoring of the key press events or the monitoring of the executing animations;
   determine when another alert has been received via the communication networks from the client; and
   initiate a security action with respect to network traffic associated with the client according to an established policy, when the determination indicates that the another alert has been received via the communication networks from the client.

14. The network traffic management system of claim 13, wherein the RAT malware detection client-side source code is further configured to:
   determine when an anomaly is observed in movement of the mouse pointer based on a deviation in a path of the mouse pointer indicative of use of the mouse pointer on more than one instance of the web browser of the client; and
   output the alert when the determining indicates that an anomaly is observed in the movement of the mouse pointer.

15. The network traffic management system of claim 13, wherein the RAT malware detection client-side source code is further configured to:
   determine when one of the animations defined in the RAT malware detection client-side source code is executing;
   output an indication to the web browser of the client that an instance of the web browser is active when the determining indicates that the one of the animations defined in the RAT malware detection client-side source code is executing; and
   determine when more than one instance of the web browser of the client is active based on the output indication and output the alert when the determination indicates that more than one instance of the web browser is active.

16. The network traffic management system of claim 13, wherein the processors are further configured to be capable of executing the stored programmed instructions to:
   determine when the web page is protected; and
   send the web page to the client without injecting the RAT malware detection client-side source code, when the determination indicates that the web page is not protected.

* * * * *